MAGNETIC DRIVE FOR FLOWMETER

Filed April 13, 1962

RALPH J. COLATRELLA
HERMAN W. SCHAUB
INVENTORS

BY Daniel A. Bobis
atty

United States Patent Office 3,158,025
Patented Nov. 24, 1964

3,158,025

MAGNETIC DRIVE FOR FLOWMETER

Ralph J. Colatrella, Newark, and Herman W. Schaub, Livingston, N.J., assignors to Worthington Corporation, Harrison, N.J., a corporation of Delaware Filed Apr. 13, 1962, Ser. No. 187,419
8 Claims. (Cl. 73—272)

This invention relates generally to a magnetic drive. More particularly the invention relates to a magnetic drive in which one of the magnetic coupling members has a pre-set axial alignment and the other magnetic coupling member is attracted into alignment therewith by the magnetic lines of force of said first magnetic coupling member.

The use of magnetic drives in the prior art is well known, but previous use had the disadvantage of having the magnetic attraction operate to cause excessive bearing wear whenever a slight misalignment occurred.

It is the object of the present invention to overcome the prior art difficulty by using a novel magnetic drive in which one of the members floats into alignment and therefore eliminates needless line bearing wear.

In accordance with the present invention a magnetic drive is provided which comprises a non-magnetic diaphragm defining a plane, a first magnetic coupling member on one side of said diaphragm in fixed rotatable relationship thereto and adapted to be rotated, a second magnetic coupling member on the other side of said diaphragm and adapted to be rotated, said first magnetic coupling member and said second magnetic coupling member magnetically attracted to each other, and said second magnetic coupling member disposed in aligned relationship to floatingly engage said diaphragm so that on rotation of one of said magnetic coupling members the motion will be transmitted to the other magnetic coupling member.

One of the objects of this invention is to avoid misalignment of the magnetic drive.

Another object of this invention is to minimize the bearing wear.

Another object of this invention is to simplify the construction of the unit in which the magnetic drive is used.

Still another object of this invention is to provide a magnetic drive unit adapted to replace drives which use stuffing boxes to prevent leakage.

Still another object of this invention is to provide a fluid tight seal between the magnetic coupling members.

With these and other objects in view as may appear from the accompanying specification, the invention consists of various features of construction and combination of parts which will be first described in connection with the accompanying drawings showing a magnetic drive of a preferred form and the features forming the invention will be specifically pointed out in the claims.

Figures 1, 2, 3, 4, 5:
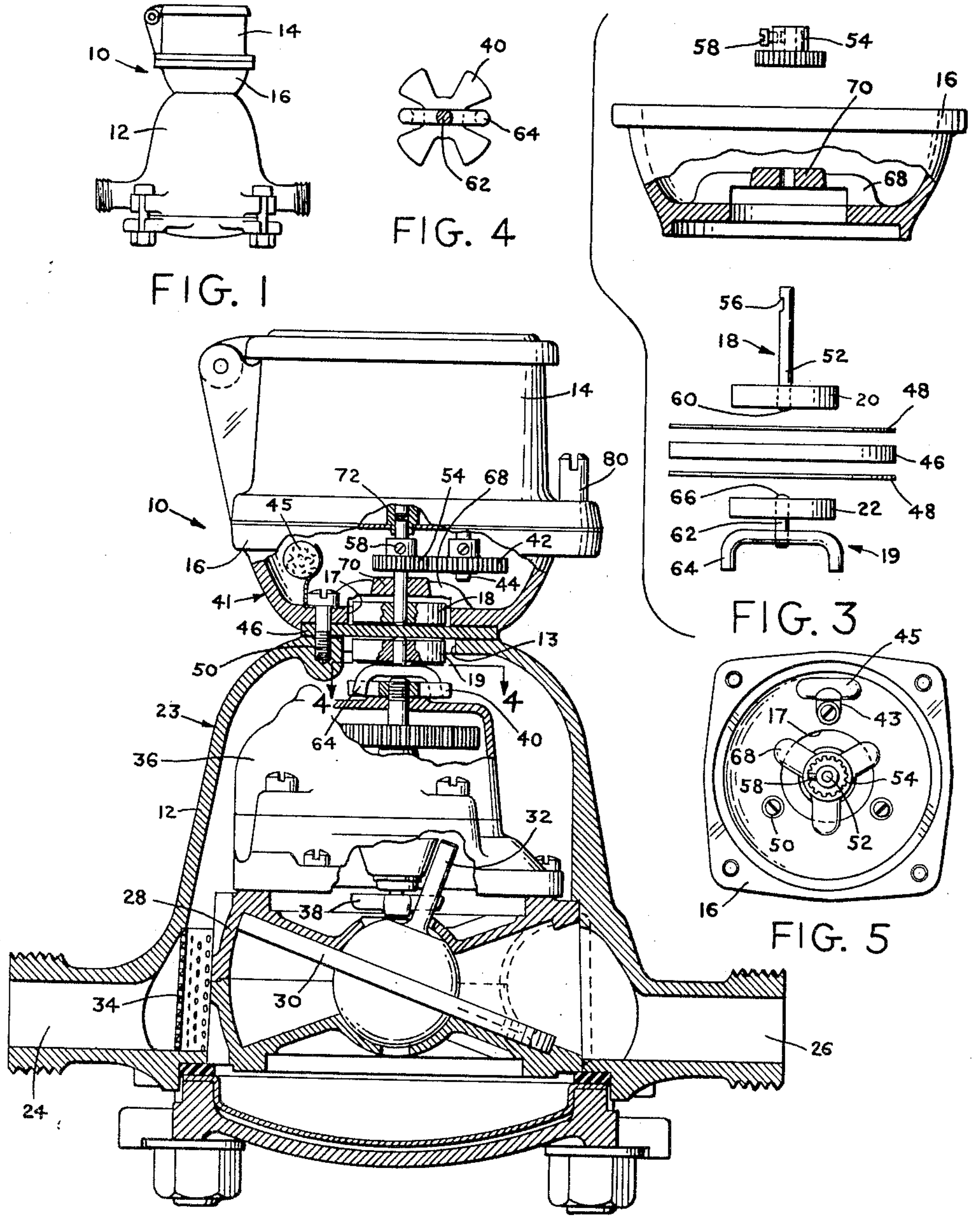
FIGURE 1 is a conventional fluid meter in which the novel magnetic drive is embodied.
FIGURE 2 is a vertical elevation partly in section of the fluid meter.
FIGURE 3 is an exploded view of the assembly of the novel magnetic drive.
FIGURE 4 is a view taken along line 4—4 of FIGURE 2.
FIGURE 5 is a top view of the register cup.

Referring more particularly to the drawings, FIGURE 1 shows a conventional fluid meter 10 in which the novel magnetic drive is embodied. Fluid meter 10 may be of any desired design as for example a disc fluid meter as shown. While the novel magnetic drive is utilized in fluid meter 10, it will be understood by those skilled in the art that it is within the scope of this invention to utilize the magnetic drive to couple any driver mechanism to a driven mechanism.

Fluid meter 10 as shown in FIGURE 2 has a casing 12 to which a register cup 16 and a register box 14 are connected in any suitable manner. Register cup 16 has a lower opening 17 which is in line with the upper opening 13 of the casing 12.

Fluid meter 10 has a wet side generally designated 23 in which the inlet 24 introduces water through a strainer 34 into the measuring chamber means 28 which activates the disc 30 thus causing the circular motion of the disc stem 32. The disc stem 32 turnably engages the lower drive arm 38 of the gear train 36 which is connected to the measuring chamber means 28. The gear train 36 is of any construction suitable to be disposed in casing 12 and while an enclosed type is shown it is understood that the open gear train could be used. The rotatable motion of the lower drive arm 38 is transmitted through the gear train 36 to the upper drive arm 40.

The dry side generally designated 41 of the meter 10 is of any conventional construction. The one shown for example has a register gear 42 which drives an intermediate register shaft 44. The remainder of the register gear does not form a part of the invention and therefore will not be further described other than to state its use, which is to record the quantity of fluid passing through the measuring chamber means 28.

To remove moisture from the air a dehydrator capsule 45 is positioned by retainer 43 in the dry side 41.

Thrust bearing plate or diaphragm 46 is disposed between casing 12 and register cup 16. Gaskets 48 are placed on either side of diaphragm 46 to form a fluid tight seal therebetween. Screws 50 join the parts in assembled position. It will be understood that any suitable connecting means could be used and screws 50 are shown merely as an example.

Magnetic coupling members 18 and 19 are disposed on either side of diaphragm 46 in the register cup 16 and the casing 12 respectively. As illustrated in FIGURE 3, magnetic coupling member 18 has a register cup magnet 20 through which a shaft 52 passes and is fixedly connected thereto. Shaft 52 has a recess 56 in the upper end thereof and at the lower tip the shaft 52 extends to form a bearing 60. Pinion gear 54 is adapted to be disposed on shaft 52 and set screw 58 will engage the recess 56 therein. Magnetic coupling member 19 has a gear train magnet 22, a shaft 62 which is connected to a connecting element 64. The shaft 62 has the upper end extending through magnet 22 to form bearing 66.

Connecting element 64 is disposed to be engaged by the upper drive arm 40 and to be rotated thereby as shown in FIGURES 2 and 4.

Shaft 52 of member 18, as illustrated in FIGURES 2 and 5, is slidably disposed in lower line bearing 70 which is formed integral with spider 68 of register cup 16. The pinion gear 54 is disposed on shaft 52 and held in position by set screw 58 engaging recess 56.

The assembly of the fluid meter 10 is not part of the invention and furthermore is well known to anyone skilled in the art and will not be recited herein except as it relates directly with the present invention. Accordingly, the casing 12 is assembled in any suitable manner and magnetic coupling member 19 is disposed in opening 13 with connecting element 64 adapted to be engaged by upper drive arm 40. Diaphragm 46 having gaskets 48 on either side thereof is disposed over opening 13. Subsequently register cup 16 is connected as by screws 50 to the casing 12 whereby a fluid tight seal is formed therebetween. On connecting register box 14 to register cup 16 in any suitable way and as by screws 80 the upper end of shaft 52 is slidably disposed in upper line bearing 72 thus establishing the pre-set axial position of magnetic coupling member 18.

In assembled position magnetic coupling members 18 and 19 are magnetically attracted so that the bearings 60 and 66 respectively will each bear against the thrust bearing plate or diaphragm 46. When water passes through the meter the upper drive arm 40 will engage the connecting element 64 to rotate magnet 22. This will cause a like rotation of magnet 20 and because the respective shafts 52 and 62 of the magnetic coupling members 18 and 19 are fixed to the magnets they will likewise be rotated therewith. First magnetic coupling member 19 is attracted by the lines of magnetic force into alignment with magnetic coupling member 18 and thus no uneven wearing of the bearings 70 and 72 will occur.

The invention has been shown and described with magnetic coupling member 18 having a pre-set axial position and magnetic coupling member 19 floatingly aligned therewith. However, it will be understood that it is within the scope of this invention to reverse this order whereby magnetic coupling member 19 would have the pre-set axial position and magnetic coupling member 18 would be floatingly aligned therewith.

It will be understood that this invention is not to be limited to the specific construction or arrangement of parts shown but that they may be widely modified within the invention defined by the claims.

What is claimed is:

1. A magnetic drive comprising
(*a*) a casing,
(*b*) a non-magnetic diaphragm in said casing to form a chamber in said casing on either side thereof,
(*c*) a mechanism disposed in each of said chambers,
(*d*) one of said mechanisms adapted to drive and the other mechanism adapted to be driven,
(*e*) a magnetic coupling member disposed on either side of said diaphragm to form a magnetic couple therebetween,
(*f*) one of said magnetic coupling members having a predetermined axial position and adapted to rotatably engage said mechanism in the chamber therewith,
(*g*) the other of said magnetic coupling members being mounted for rotatable movement on an axis which is laterally shiftable; being attracted into axial alignment with said one magnetic coupling by said one magnetic coupling,
(*h*) a bearing disposed on said second mentioned magnetic coupling member to engage said diaphragm,
(*i*) connecting means connected to said second mentioned magnetic coupling member and adapted to engage said mechanism in the chamber therewith to transmit rotatable motion thereby.

2. The combination claimed in claim 1 wherein each of said magnetic coupling members includes a magnet therein.

3. A magnetic drive for a fluid meter having a driver mechanism and a driven mechanism separated by a liquid-tight non-magnetic diaphragm defining a plane, and said drive comprising:
(*a*) a pair of magnets on either side of said diaphragm,
(*b*) one of said magnets axially positioned in said meter,
(*c*) the other said magnet mounted for rotatable movement on an axis which is laterally shiftable and attracted into axial alignment with the first mentioned magnet by the first mentioned magnet,
(*d*) each of said magnets operatively associated with the mechanism on the side of the diaphragm therewith to transmit rotatable motion therethrough on operation of said meter.

4. The combination claimed in claim 3 wherein said pair of magnets disposed in parallel relationship with said diaphragm.

5. The combination claimed in claim 4 wherein said pair of magnets each having a bearing thereon to engage said diaphragm therewith on rotation thereof.

6. A magnetic drive for a fluid meter having a measuring chamber, metering means to meter the flow through said measuring chamber, a gear train in operative association with said metering means, register means to record the flow through said measuring chamber; said magnetic drive means disposed operative responsive to said gear train to transmit the motion thereof to said register means, said magnetic drive means comprising:
(*a*) a first magnetic member having a fixed axial position and adapted to rotatably engage said register means,
(*b*) a second magnetic member mounted for rotatable movement on an axis which is laterally shiftable and attracted into axial alignment with said first magnetic member by said first magnetic member,
(*c*) said second magnetic member in rotatable engagement with said gear train and adapted to be rotated thereby.

7. The combination claimed in claim 6 wherein
(*a*) a non-magnetic diaphragm is disposed in said meter between said first magnetic member and said second magnetic member to prevent leakage of fluid therebetween,
(*b*) said diaphragm forming a dry side adjacent said first magnetic member and a wet side adjacent said second magnetic member.

8. The combinaion claimed in claim 7 wherein
(*a*) said first and said second magnetic members include magnets,
(*b*) said first and said second magnetic members each disposed perpendicular to their axis of rotation.

References Cited by the Examiner

UNITED STATES PATENTS

| | | | |
|---|---|---|---|
| 2,346,904 | 4/44 | Carlson | 310—103 X |
| 2,354,568 | 7/44 | Weisse | 73—272 |
| 2,466,468 | 4/49 | Neal | 310—103 X |
| 2,779,513 | 1/57 | Dickey. | |

RICHARD C. QUEISSER, *Primary Examiner.*

ROBERT L. EVANS, *Examiner.*